United States Patent
Simon et al.

(10) Patent No.: US 12,207,664 B2
(45) Date of Patent: Jan. 28, 2025

(54) COLD SMOKER

(71) Applicant: Halo Products Group, LLC, Elizabethtown, KY (US)

(72) Inventors: Paul J. Simon, Elizabethtown, KY (US); Michael R. Giebel, Joplin, MO (US)

(73) Assignee: WH PRODUCTS, LLC, Columbus, OH (US)

( * ) Notice: Subject to any disclaimer, the term of this patent is extended or adjusted under 35 U.S.C. 154(b) by 0 days.

(21) Appl. No.: 17/824,681

(22) Filed: May 25, 2022

(65) Prior Publication Data

US 2022/0378056 A1 Dec. 1, 2022

Related U.S. Application Data

(60) Provisional application No. 63/192,925, filed on May 25, 2021.

(51) Int. Cl.
*A23B 4/052* (2006.01)

(52) U.S. Cl.
CPC .................................. *A23B 4/052* (2013.01)

(58) Field of Classification Search
CPC .. A23B 4/052; A23B 4/0523; A23V 2002/00; A47J 37/04; A47J 37/07; A47J 37/0709
See application file for complete search history.

(56) References Cited

U.S. PATENT DOCUMENTS

| | | | | |
|---|---|---|---|---|
| 4,669,447 A | * | 6/1987 | Kelly | A23B 4/0523 99/481 |
| 5,070,857 A | * | 12/1991 | Sarten | A47J 37/0704 126/41 R |
| 6,161,534 A | * | 12/2000 | Kronman | A47J 37/07 126/41 R |
| 2007/0158331 A1 | * | 7/2007 | Morrow | A47B 77/08 219/412 |
| 2009/0199839 A1 | * | 8/2009 | Hulsey | A47J 37/07 126/25 A |
| 2013/0139706 A1 | * | 6/2013 | Robertson | A47J 37/07 99/419 |
| 2014/0360387 A1 | * | 12/2014 | Bogdon | A23B 4/0523 99/476 |
| 2017/0238565 A1 | * | 8/2017 | Giebel | A23B 4/0523 |
| 2021/0235928 A1 | * | 8/2021 | West | A47J 37/0704 |

* cited by examiner

*Primary Examiner* — Dana Ross
*Assistant Examiner* — Adam M Eckardt
(74) *Attorney, Agent, or Firm* — David R Yohannan

(57) ABSTRACT

A solid pellet fueled apparatus for imparting a smoke flavor to food items is disclosed. The apparatus may include an enclosed housing having an upper food chamber and a lower drawer. The lower drawer may include a pan for receiving water ice and a pellet burning system. Cool smokey air generated by the contents of the lower drawer rises through the food chamber to impart a smoke flavor to food.

28 Claims, 14 Drawing Sheets

COLD SMOKER

CROSS-REFERENCE TO RELATED APPLICATIONS

This application claims the benefit of U.S. Provisional Application No. 63/192,925 filed May 25, 2021, the disclosure of which is hereby incorporated by reference herein in its entirety.

FIELD OF THE INVENTION

Embodiments of the present invention relate to food flavoring and/or smoking appliances.

BACKGROUND OF THE INVENTION

Outdoor cooking, and particularly the use of outdoor barbecue grills, smokers, and griddles, remains very popular. A number of different devices are currently available to smoke food outdoors. However, the majority of devices for smoking foods generate internal temperatures of at least 200-250 degrees Fahrenheit or more. Accordingly, such high internal temperature devices cannot be used to smoke foods at lower (i.e., cool or cold) temperatures. Foods such as cheese, for example, require cool or cold smoke in order to impart a smoke flavor to them without melting and ruining the cheese. While there are add-on devices that can be attached to high internal temperature smokers in order to generate lower temperature smoke, to date there has been no reliable and affordable self-contained cold smoker apparatus available to the backyard food smoking enthusiast. In view of the foregoing, there is an acute need for a cost-effective single unit apparatus for cold smoking foods.

Indeed, it has been discovered through development of a cold smoker of the type described herein that it is advantageous to cold smoke some foods in a frozen state. For example, foods such as fish may take on a superior smoke flavor when the smoking operation is conducted while the fish remains frozen. Accordingly, there is a need for an apparatus that is available to the backyard enthusiast to smoke foods while they remain in a frozen or largely frozen state. There is a need also for a pellet smoker that can cold smoke foods at relatively low temperatures (e.g., below about 250 F degrees).

Smoke generating devices require some form of power and/or fuel to combust a fuel and generate a continuous supply of smoke. Over the years, the most popular power/fuel source has varied. Historically, popular fuel sources for generating smoke have included wood logs and chips, charcoal briquettes, and more recently biomass pellets. References herein to a "pellet smoker" are intended to include all smokers that use some form of pelletized fuel, whether or not such fuel is technically considered biomass fuel. Biomass pellets have several advantages over other fuel sources for outdoor smoking. For one, biomass pellets are relatively easy and safe to transport and store. As compared with charcoal or wood, biomass pellets are also capable of providing a controlled burn rate and level of heat. Still further, biomass pellets may be manufactured to provide a particular "flavor" to the food as a result of combusting a pellet including a particular wood type. For example, a consumer may select hickory, maple, or cherry pellets, or a combination of pellet flavors, to impart a desired flavor to the food as a result of being immersed in the smoke produced by combusting the pellet. Accordingly, there is a need for an apparatus that is suitable for using a pellet fuel source.

Existing pellet smokers have some disadvantages as currently designed. For example, existing pellet smokers typically require a continuous supply of alternating current (AC) power limiting the use of the smoker to locations with such power supplies. Thus, there is a need for a battery-operated pellet smoker that is untethered to a continuous supply of AC electrical power.

Existing smokers also rarely, if ever, include transparent elements which permit visual monitoring of the smoke level and food items in the smoker. Accordingly, there is a need also for a smoker that can cold smoke foods within a food chamber that permits a user to easily view the smoke level and foods within the chamber without opening the smoker.

Existing cold smokers, which require an add-on cold air generating device coupled with a separate high internal temperature smoke generating device, may be awkward to operate for ice replacement during the cold smoking process. Accordingly, there is a need also for a cold smoker that improves the ability of replenishing cooling material, such as ice, in the smoker for a cold smoking process.

OBJECTS OF THE INVENTION

Accordingly, it is an object of some, but not necessarily all embodiments of the present invention to provide a cost-effective single unit apparatus for cold smoking foods.

It is also an object of some but not necessarily all embodiments of the present invention to provide a cold smoker capable of smoking foods while they remain in a frozen or largely frozen state.

It is also an object of some but not necessarily all embodiments of the present invention to provide a cold smoker that is untethered to a continuous supply of AC electrical power.

It is also an object of some but not necessarily all embodiments of the present invention to provide a cold smoker that can cold smoke foods at relatively low temperatures.

It is also an object of some but not necessarily all embodiments of the present invention to provide a cold smoker that can cold smoke foods within a food chamber that permits a user to easily view the smoke level and foods within the chamber without opening the smoker.

It is another object of some, but not necessarily all embodiments of the present invention to provide a cold smoker that improves the ability of replenishing cooling material, such as ice, in the smoker for a cold smoking process.

SUMMARY OF EMBODIMENTS OF THE INVENTION

Responsive to the foregoing challenges, Applicant has developed an innovative food smoking apparatus, comprising: a main body defining a substantially enclosed space and having an upper portion and a lower portion; a food chamber defined by the upper portion of the main body; a first ice tray disposed within the lower portion of the main body below the food chamber, said first ice tray being configured to receive water ice; and a fuel tray disposed within the lower portion of the main body adjacent to the first ice tray and below the food chamber, said fuel tray being configured to receive solid fuel pellets or wood chips.

Applicant has further developed an innovative food smoking apparatus, comprising: a main body defining a substantially enclosed space; a food chamber defined by a first portion of the main body; an ice tray disposed within a second portion of the main body adjacent to the food chamber, said ice tray being configured to receive water ice; and a fuel tray disposed within a third portion of the main body adjacent to the food chamber, said fuel tray being configured to receive solid fuel pellets or wood chips.

Applicant has still further developed an innovative method of cold smoking a food item using a food smoking apparatus, having: a main body defining a substantially enclosed space; a food chamber defined by a first portion of the main body; an ice tray disposed within a second portion of the main body adjacent to the food chamber, said ice tray being configured to receive water ice; and a fuel tray disposed within a third portion of the main body adjacent to the food chamber, said fuel tray being configured to receive solid fuel pellets or wood chips, said method comprising the steps of: placing a frozen food item in the food chamber for a period of time; and generating smoke within the main body by combusting the solid fuel pellets or wood chips during the period of time.

It is to be understood that both the foregoing general description and the following detailed description are exemplary and explanatory only and are not restrictive of the invention as claimed.

BRIEF DESCRIPTION OF THE DRAWINGS

In order to assist the understanding of this invention, reference will now be made to the appended drawings, in which like reference characters refer to like elements. The drawings are exemplary only and should not be construed as limiting the invention.

DETAILED DESCRIPTION OF EMBODIMENTS OF THE INVENTION

Figure 1:
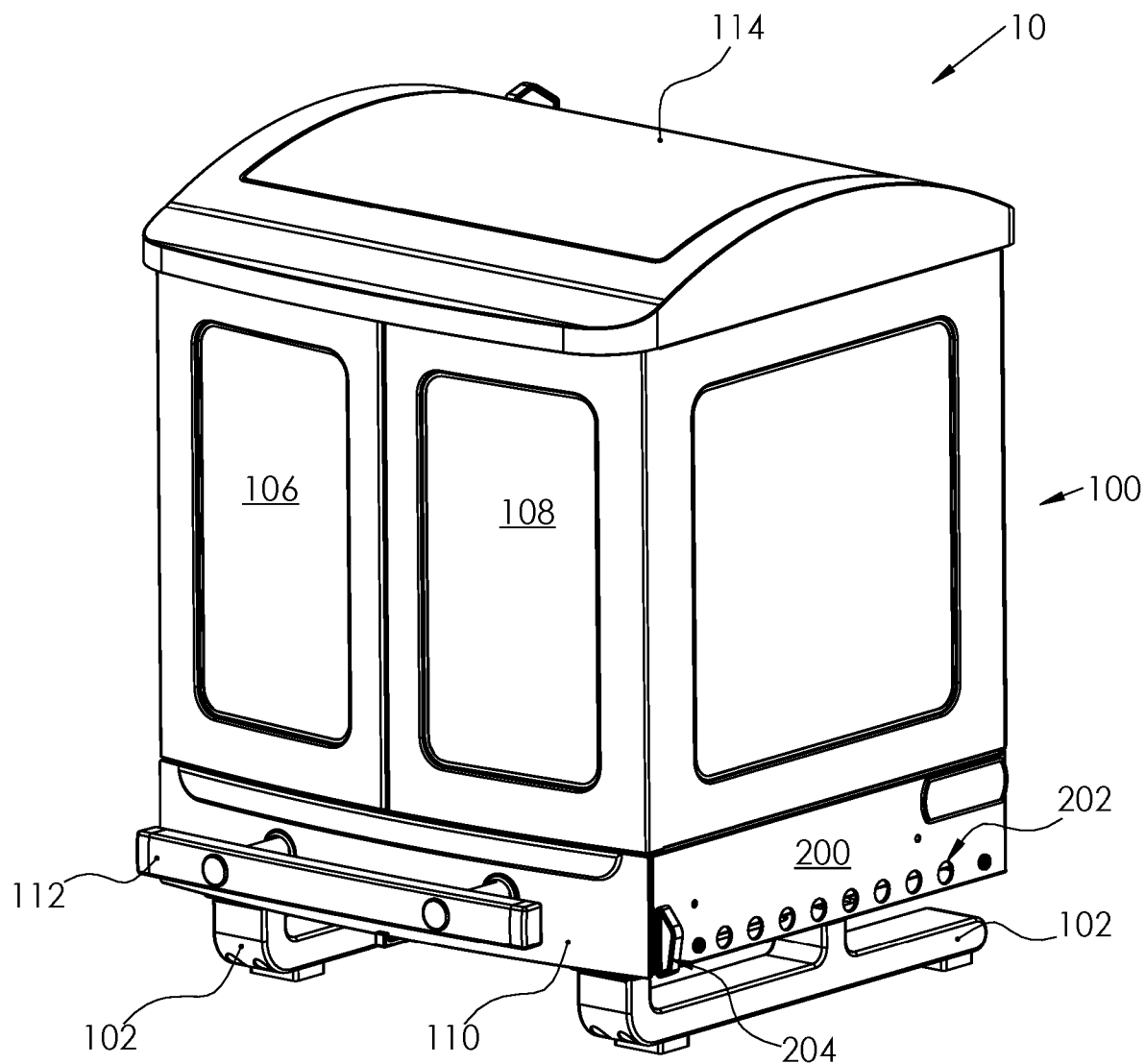
FIG. 1 is a perspective view of a cold smoker with closed doors in accordance with embodiments of the invention.

Reference will now be made in detail to embodiments of the present invention, examples of which are illustrated in the accompanying drawings. With reference to FIGS. 1-14, a cold smoker 10 may include a main body 100 defining a substantially enclosed space and two or more spaced feet 102. The main body 100 may include a back wall 104, a left door 106, a right door 108, a drawer 110, and a lid 114. One or more smoking grids 118 may be removably mounted within the food chamber, i.e., the portion of the cold smoker 10 above the drawer 110 and within or defined by the back wall 104, the left and right doors 106 and 108, and the lid 114. The food chamber portion of the cold smoker 10 preferably may have a volume of about 1-3 cubic feet, more preferably about 1-2 cubic feet, and even more preferably about 1.25-1.5 cubic feet. The back wall 104 may have a hollow interior and be constructed from an elongated U-shaped metal member welded to a second metal member. A grid cantilever connector may be used to connect the cooking grids 118 to the back wall 104. The left door 106 and the right door 108 may be connected to the back wall 104 by one or more hinges. Each door 106 and 108 may have one or more clear polycarbonate or other material windows. The windows may include a reflective coating or other element to reduce solar heating of the smoking chamber.

Portions of the main body 100, including without limitation, the back wall 104, the frames of the left and right doors 106 and 108, the drawer 110, and the lid 114 preferably may be constructed largely or entirely of stainless steel and/or other formed metal(s). Each foot 102 may be constructed of formed metal or plastic and include upward extending elements connected to the main body 100. The underside of the main body 100 may include one or more openings (not shown) provided adjacent to each foot 102 to serve as air intake vents.

The drawer 110, which in its most simple form may simply be an open top enclosure, may include conventional drawer sliders that permit the drawer to be easily slid in and out of the front of the remainder of the main body 100 to permit access to drawer contents. The drawer sliders may "seat" when the drawer 110 is fully inserted as part of the main body 100 so that if left undisturbed the drawer will remain shut. A drawer handle 112 may be used to unseat the drawer and open it or move it relative to the rest of the main body 100. The drawer 110 may include an ice tray compartment 120 and other features, discussed in detail below.

Figure 14:
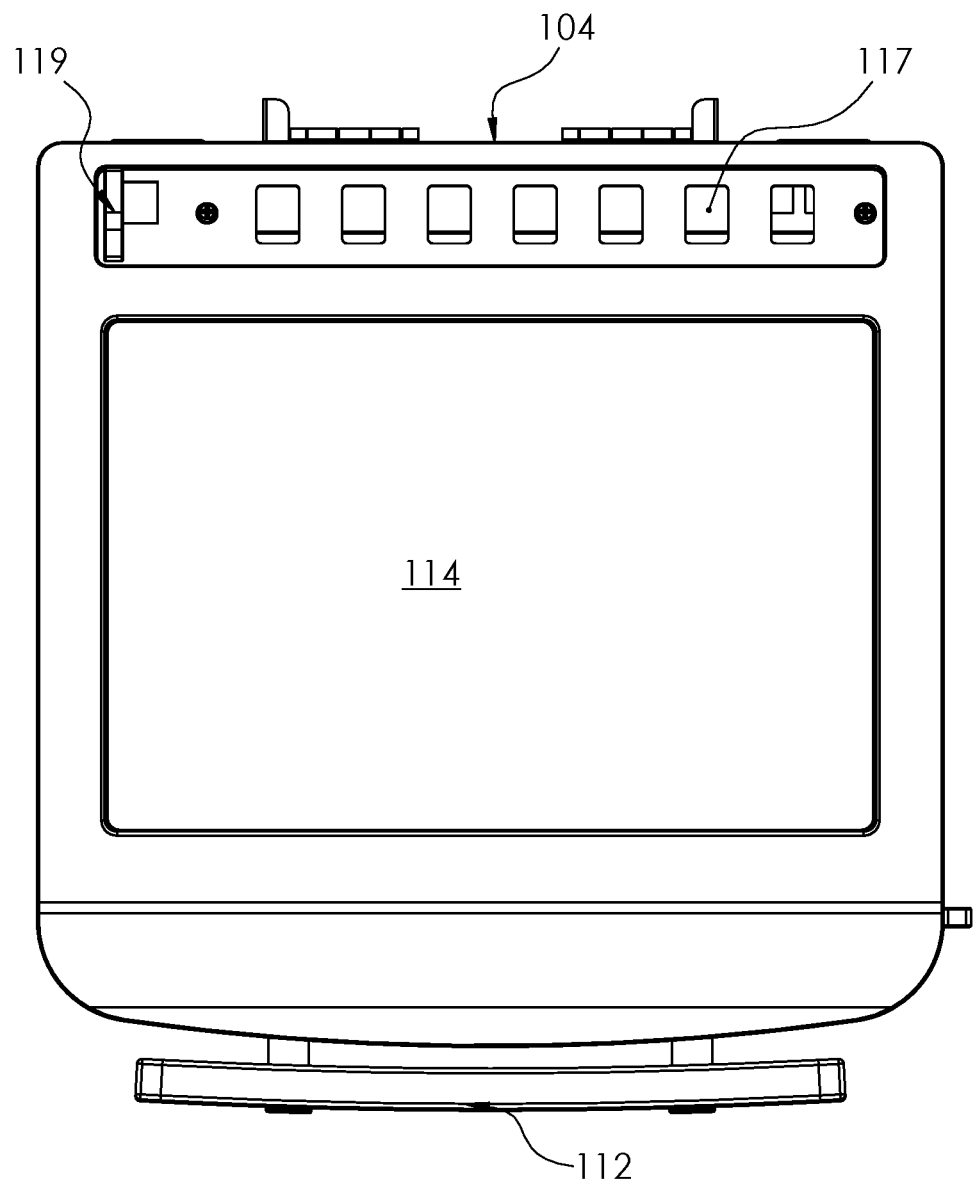
FIG. 14 is a top view of a cold smoker in accordance with embodiments of the invention.

The lid 114 portion of the main body 100 may be gently curved or bowed from back-to-front in a complimentary fashion with a central peak. With particular reference to FIG. 14, the lid 114 may be attached to the back wall 104 of the main body 100 by one or more hinges. An air exhaust vent 117 may be provided at the rear portion of the lid 114 to permit smoke to rise through the food chamber and exit from the main body 100. The air exhaust vent 117 may incorporate one or more slots or round holes provided in the lid 114 that are selectively covered by a sliding flue handle 119 and associated flue plate. Preferably, the flue handle 119 and associated flue plate are restricted to cover no more than about seventy percent (70%) of the area of the provided slots or round holes in the air exhaust vent 117.

Figure 2:
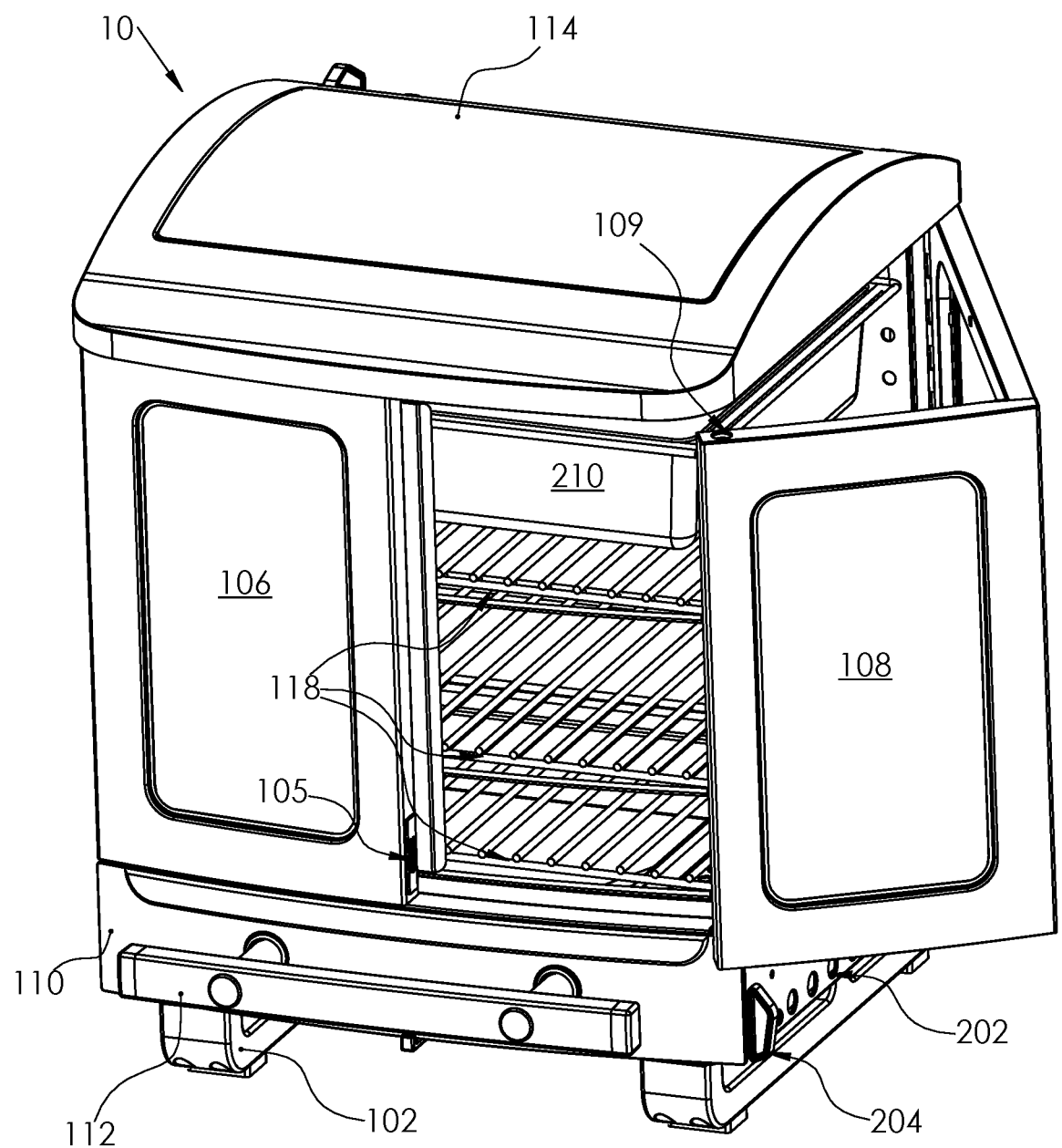
FIG. 2 is a perspective view of a cold smoker with one door opened in accordance with embodiments of the invention.
Figure 3:
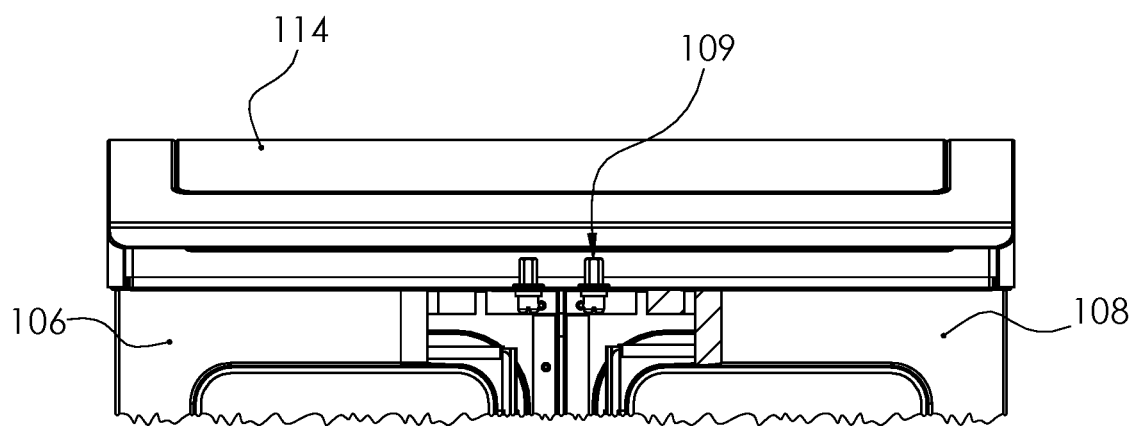
FIG. 3 is a front cross-sectional view of a connector assembly extending between the doors and lid of a cold smoker in accordance with embodiments of the invention.
Figure 4:
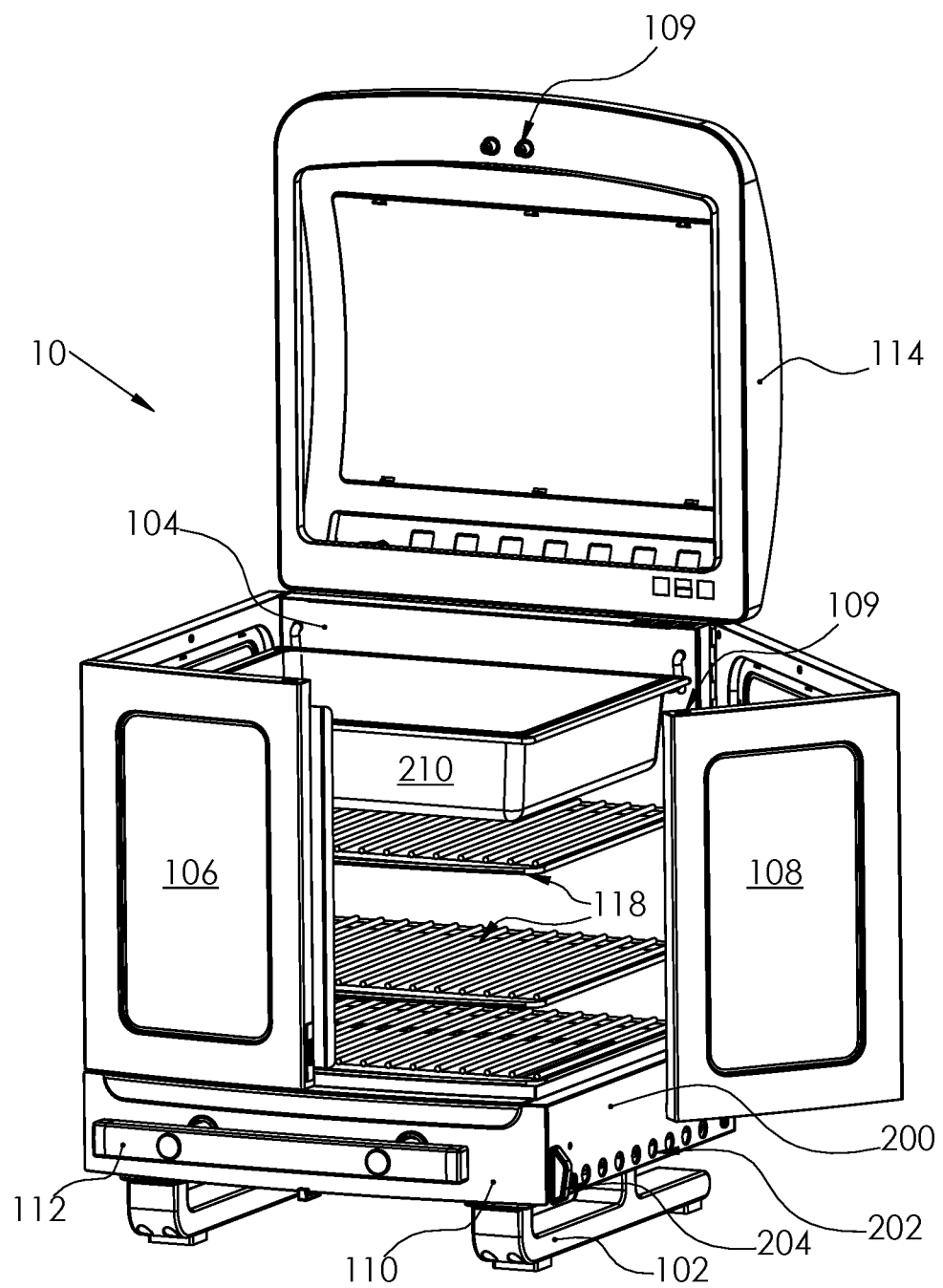
FIG. 4 is a perspective view of a cold smoker with one door opened and the lid open in accordance with embodiments of the invention.
Figure 5:
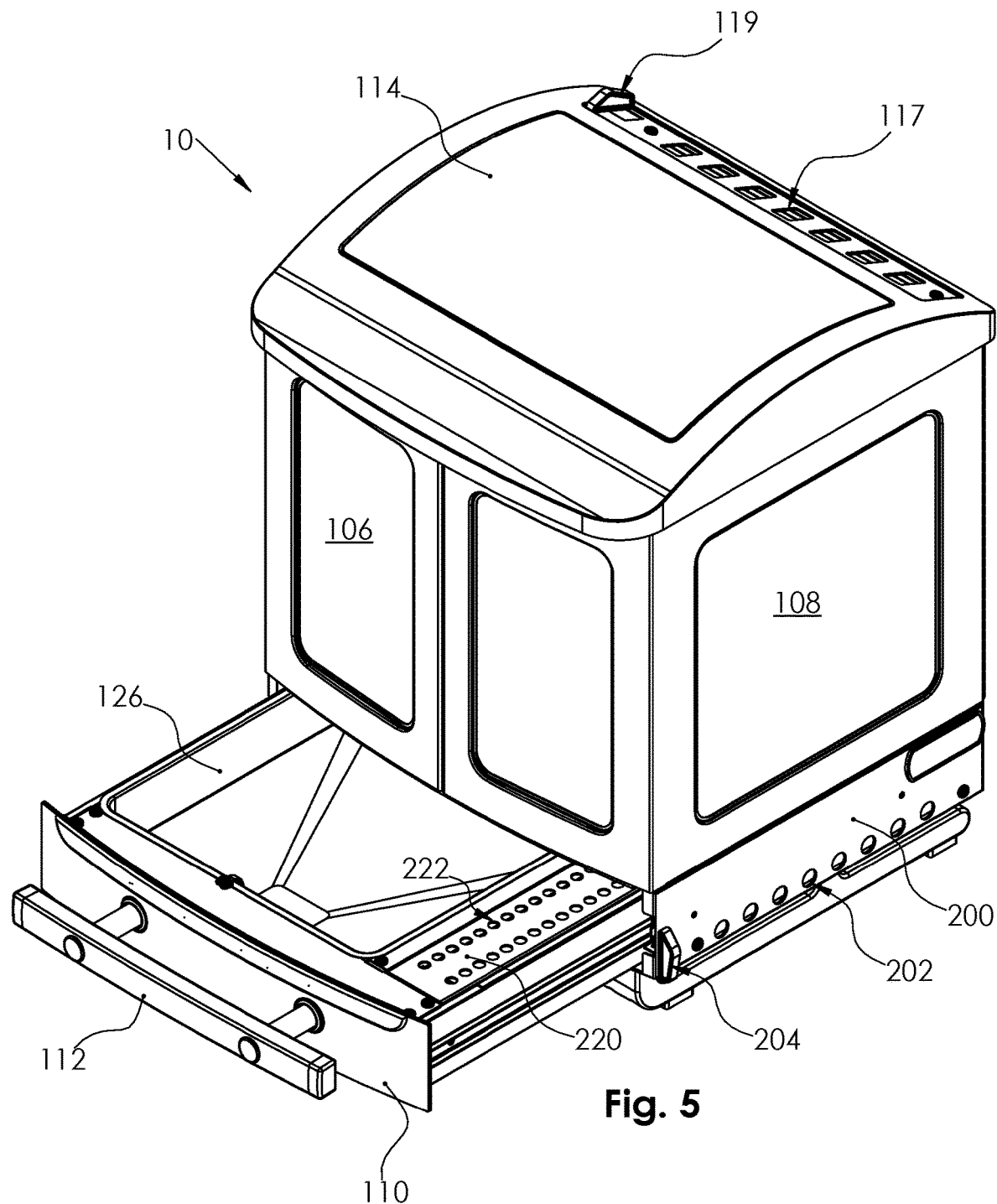
FIG. 5 is a perspective view of a cold smoker with an opened drawer in accordance with embodiments of the invention.
Figure 6:
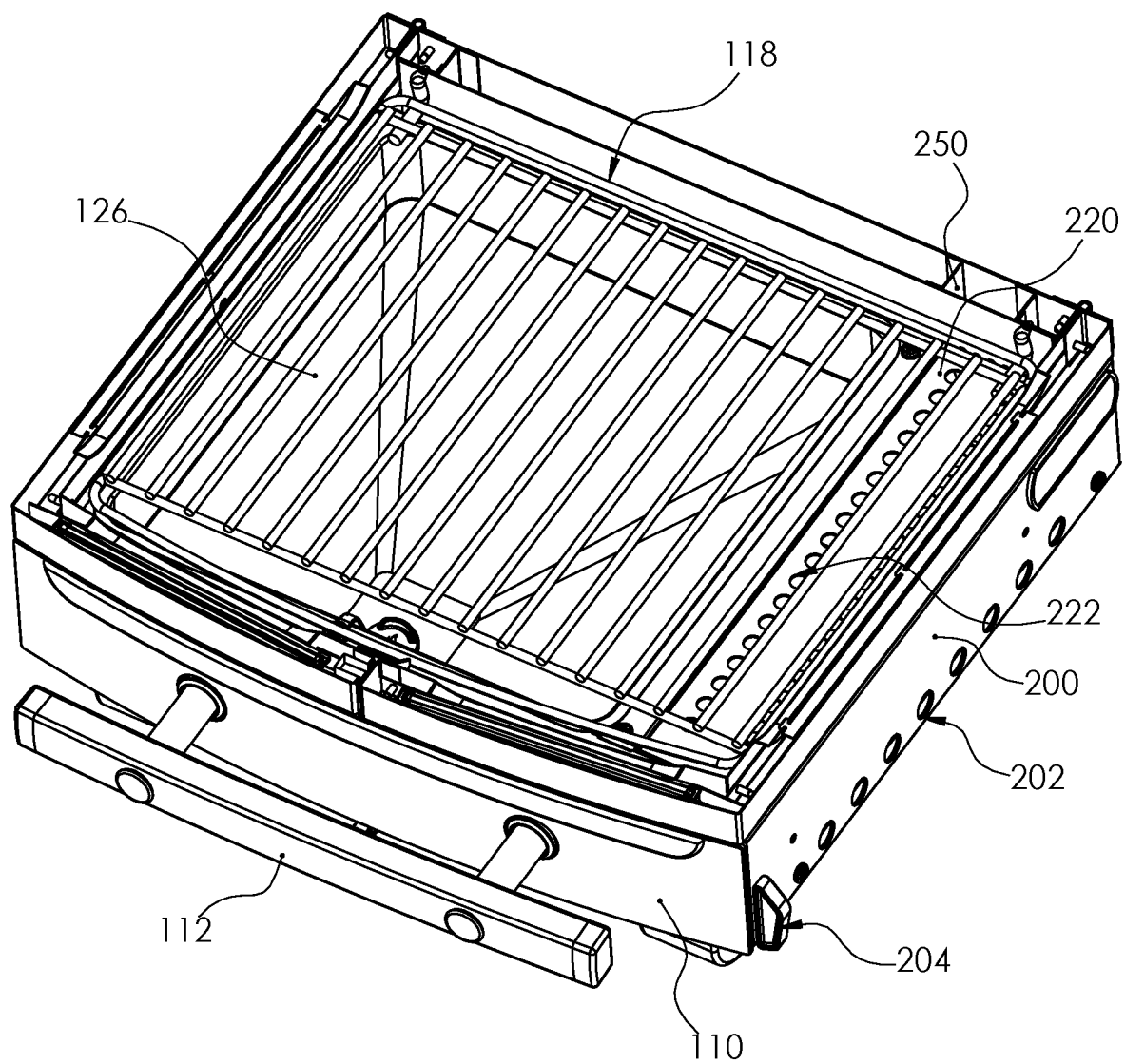
FIG. 6 is a perspective view of a drawer for a cold smoker in accordance with embodiments of the invention.
Figure 7:
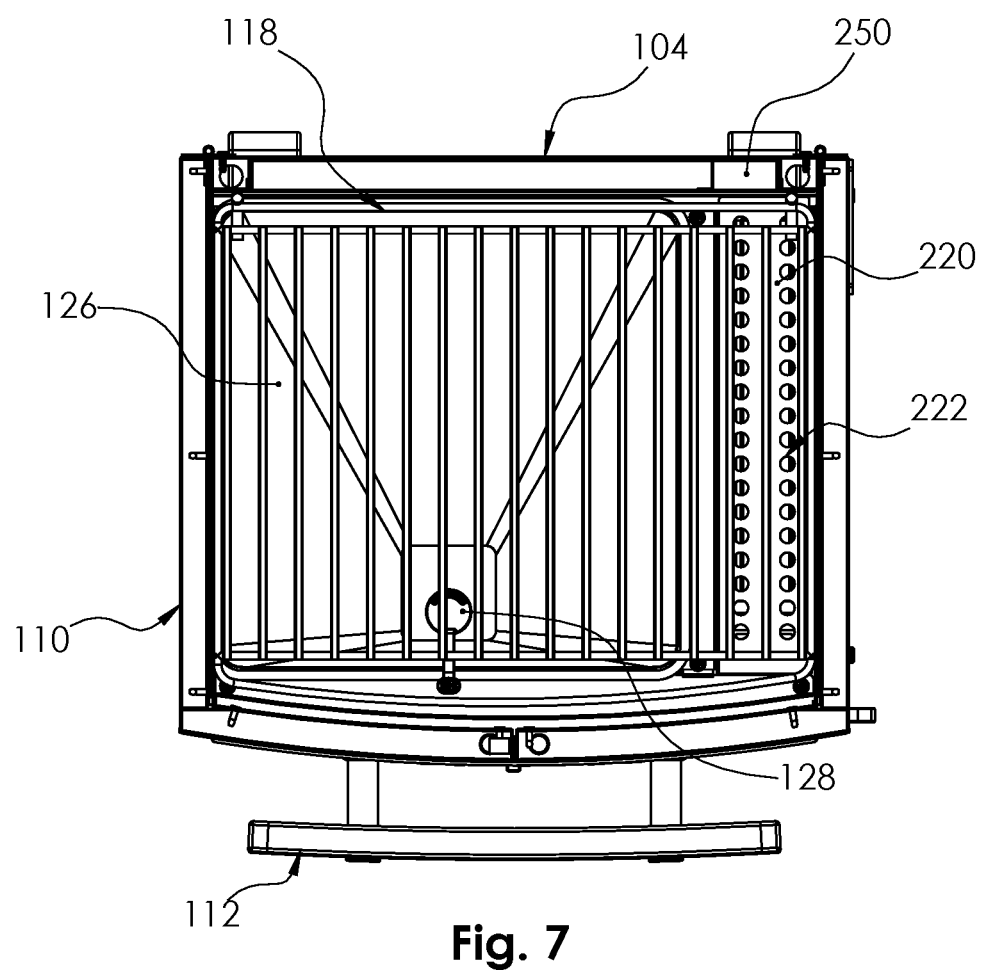
FIG. 7 is a top view of a drawer for a cold smoker in accordance with embodiments of the invention.

With particular reference to FIGS. 2-4, the lid 114 and the gull wing doors 106 and 108 may include one or more pins and/or one or more mating holes that collectively provide a door-lid connector assembly 109. In the embodiment illustrated, the door-lid connector assembly 109 includes pins extending downward from a front lip of the lid 114 that align with and are configured to engage mating holes provided on the upper edge of the left and right doors 106 and 108 to keep the doors locked shut during smoking operation. Preferably, the holes provided in the left and right doors 106 and 108 may be extruded downward to create a fairlead for easy engagement of the lid pins. The bottom edges of the left and right doors 106 and 108 may also include one or more embosses and a mating detent in the top outer edge of the drawer 110 so that the left and right doors engage the drawer 110 and are supported thereby when all elements are shut. In order to gain access to the smoking chamber, the lid 114 may need to be opened first, before each of the left and right doors 106 and 108 can be opened. The left and right doors 106 and 108 may also include a magnetic connector assembly 105 to keep the doors securely sealed to each other when closed.

With particular reference to FIGS. 1-2, and 4-13, a lower portion of the main body 100 may be formed by the open top enclosure or drawer 110. The drawer 110 may include an ice tray compartment 120 and a fuel tray cavity 152 formed therein and having a divider wall therebetween. A first ice tray 126 may be disposed within ice tray compartment 120 of the drawer 110 (i.e., the lower portion of the main body 100) below the food chamber (i.e., the upper portion of the main body). The first ice tray 126 may be configured to receive water ice and the ice tray compartment 120 may be configured to securely and removably receive the ice tray 126. An ice tray drain hole 128 may be provided at a lower collection point of the first ice tray 126. Melt water may flow through the ice tray drain 128 and through a drain hole provided in the bottom surface of the main body 100. With reference to FIGS. 2 and 4, an optional second ice tray 210 may be disposed within the main body 100 above the first ice tray 126. The second ice tray 210 also may be configured to receive water ice. The ice trays 126 and 210 may be constructed of any material (metal, plastic, and the like) that can withstand hot outer perimeter temperatures, cold interior temperatures, and not rust in the presence of ice and water.

With renewed reference to FIGS. 1-2, and 4-13, a fuel tray 150 may be disposed and suspended within a fuel tray cavity 152 provided in the drawer 110 (i.e., the lower portion of the main body 100) adjacent to the first ice tray 126 and below the food chamber. The fuel tray 150 may be configured to receive and facilitate the combustion of solid fuel pellets or wood chips. A removeable fuel tray cover 220 may rest on the upper edge of the fuel tray 150. The fuel tray cover 220 may include an array of circular openings 222 which permit air and smoke to travel therethrough.

Figure 12:
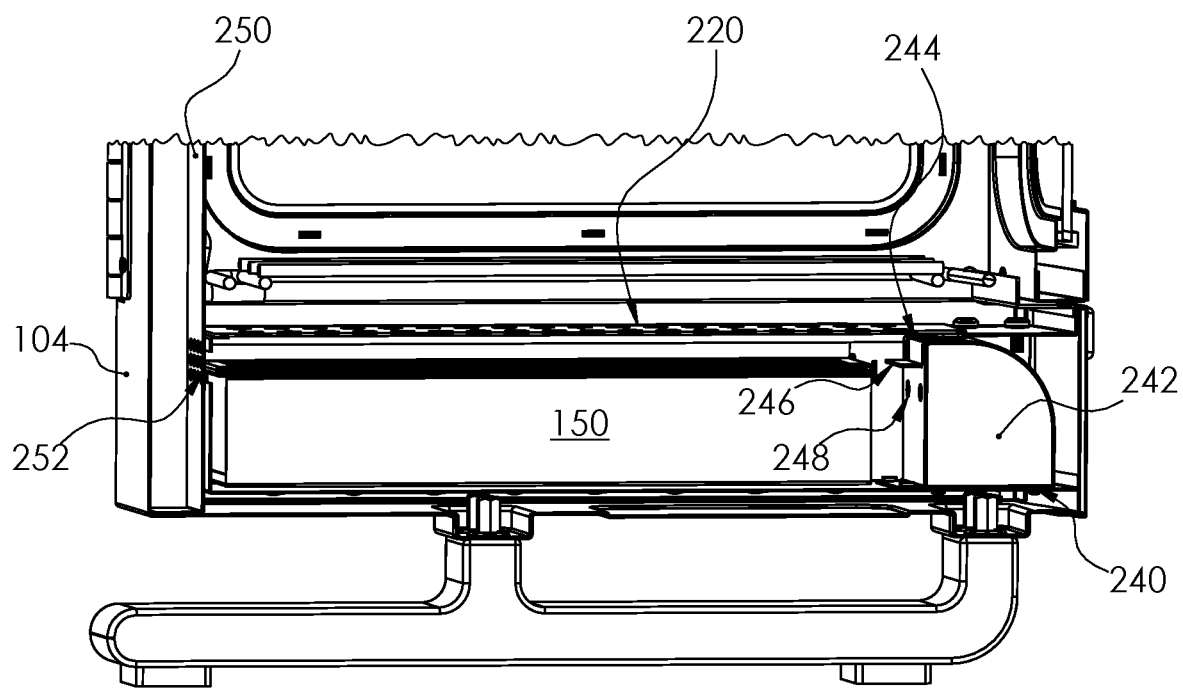
FIG. 12 is a side cross-sectional view of a lower portion of the main body showing a fan assembly and fuel tray and back wall chimney for a cold smoker in accordance with embodiments of the invention.
Figure 13:
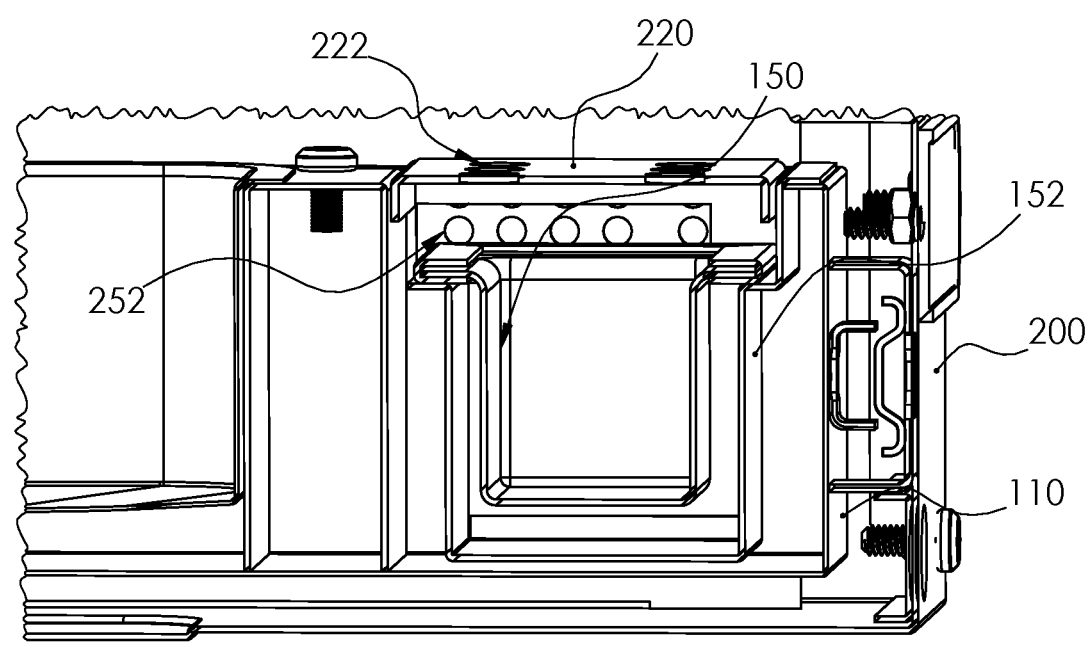
FIG. 13 is a pictorial cross-sectional view of fuel tray for a cold smoker in accordance with embodiments of the invention.

A fan assembly 240 including a rotary fan, a fan housing 242, a fan outlet 244, a fan outlet lip 246 and one or more fan housing vents 248 may be disposed within the drawer 110 (i.e., the lower portion of the main body 100) adjacent to the fuel tray 150. The fan housing 242 may have a lower open end, a first side wall, and a second side wall. The fan may be disposed in the fan housing 242 above the lower open end. With particular reference to FIG. 12, the first and second side walls of the fan housing 242 may extend generally vertically away from the lower open end to the upper fan housing outlet 244. The first side wall of the fan housing 242 may include a curved wall portion that transitions the first side wall from extending generally vertically to extending generally horizontally towards the fan housing outlet 244 such that the fan housing outlet is provided opposite to the curved wall portion of the first side wall. A fan outlet lip 246 may extend away from a bottom edge of the fan housing outlet 244 towards an upper edge of the fuel tray 150. Preferably, the lip 246 is generally vertically aligned with the upper edge of the fuel tray 150. One or more fan housing vents 248 may be provided in the fan housing 242 below the fan housing outlet 244. An array of side wall vents 202 may be provided in a side wall portion 200 of the main body 100 adjacent to the fuel tray 150. A flue assembly 204 may be configured to selectively cover a portion of the array of side wall vents 202.

With particular reference to FIGS. 6-8 and 12-14, an internal chimney 250 may be provided along the back wall 104 of the main body 100. One or more chimney inlets 252 may be provided at a lower end of the chimney 250 and one or more chimney outlets may be provided at an upper end of the chimney. The chimney inlets 252 are preferably adjacent to an upper edge of the fuel tray 150, and the chimney outlets are provided within the main body 100 proximal to the air exhaust vent 117.

Figure 8:
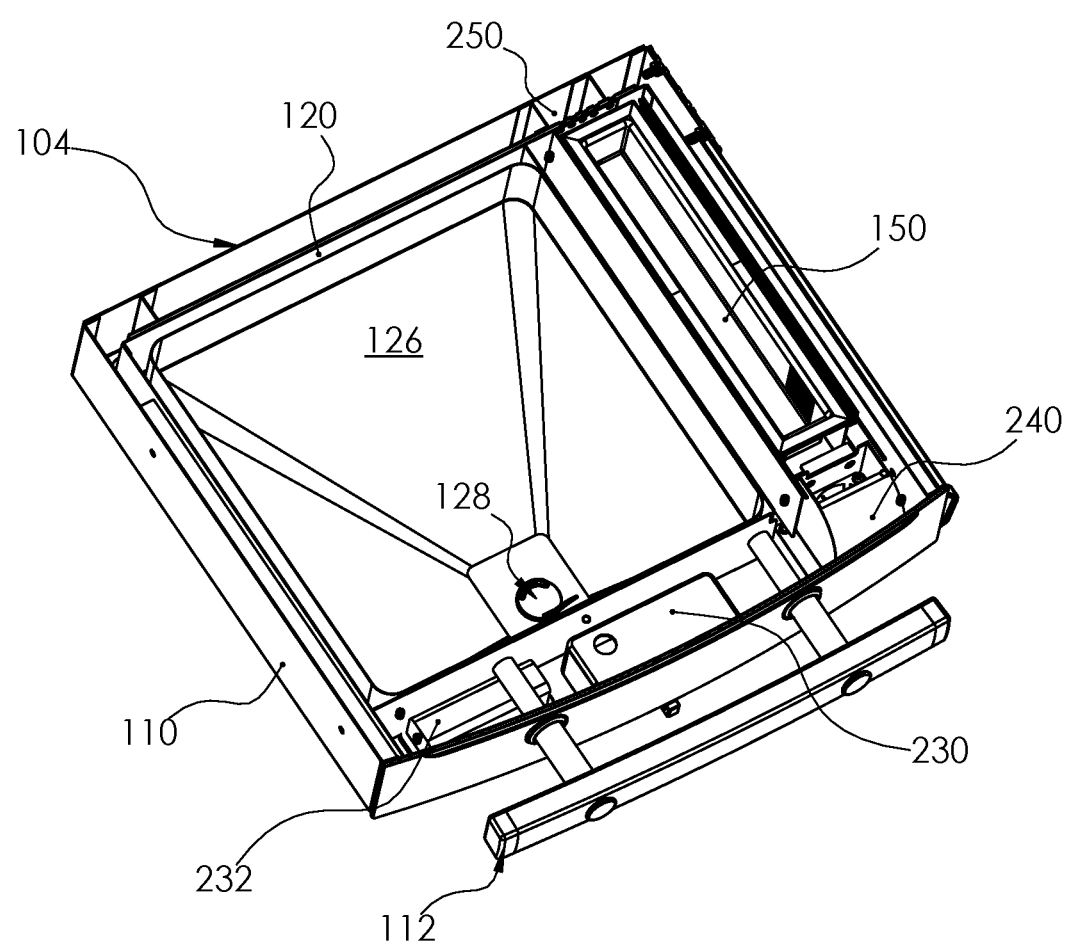
FIG. 8 is a perspective view of a drawer showing details of an ice tray and fuel tray for a cold smoker in accordance with embodiments of the invention.
Figure 9:
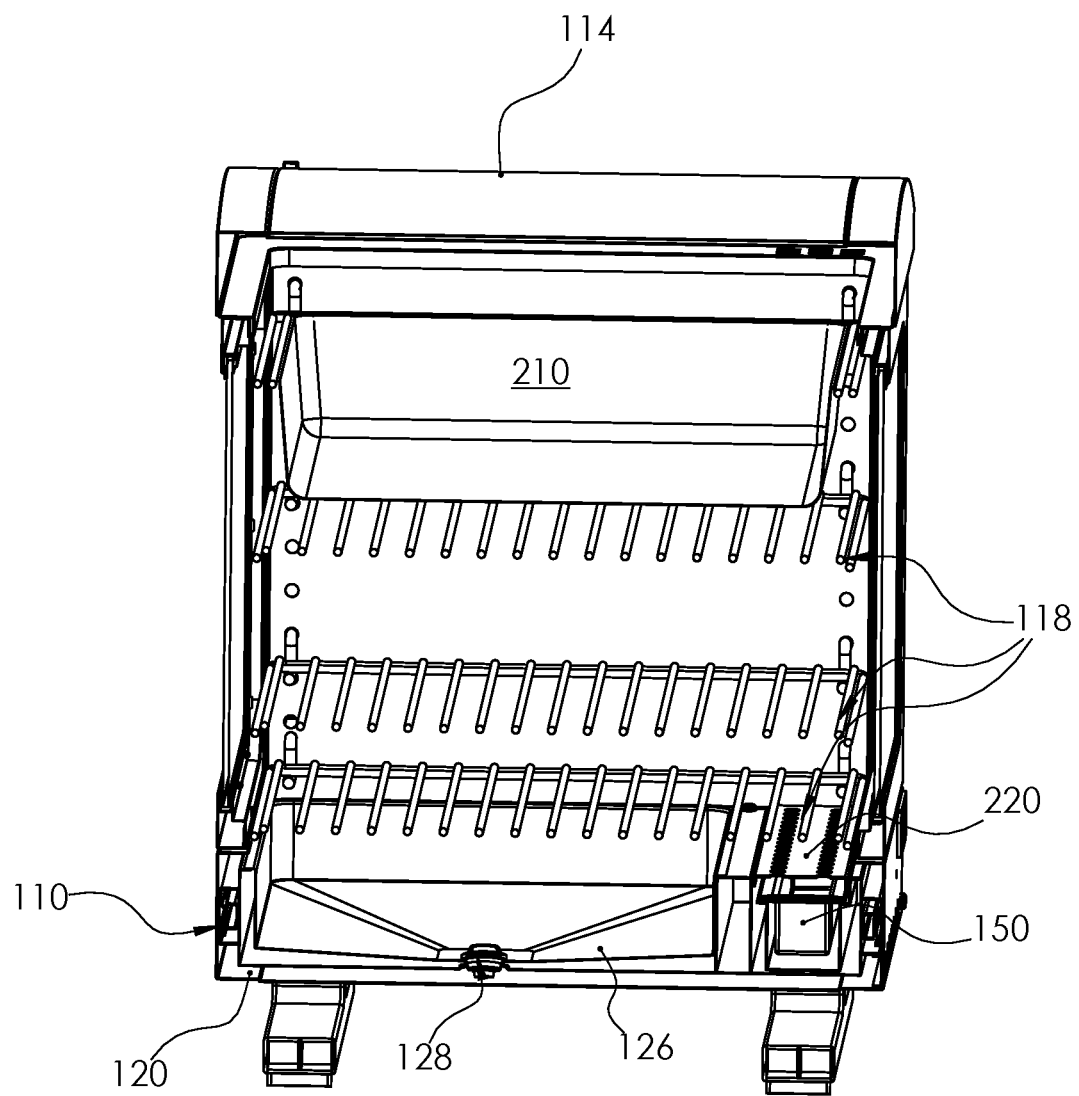
FIG. 9 is a perspective cross-sectional view of a portion of the main body for a cold smoker in accordance with embodiments of the invention.
Figure 10:
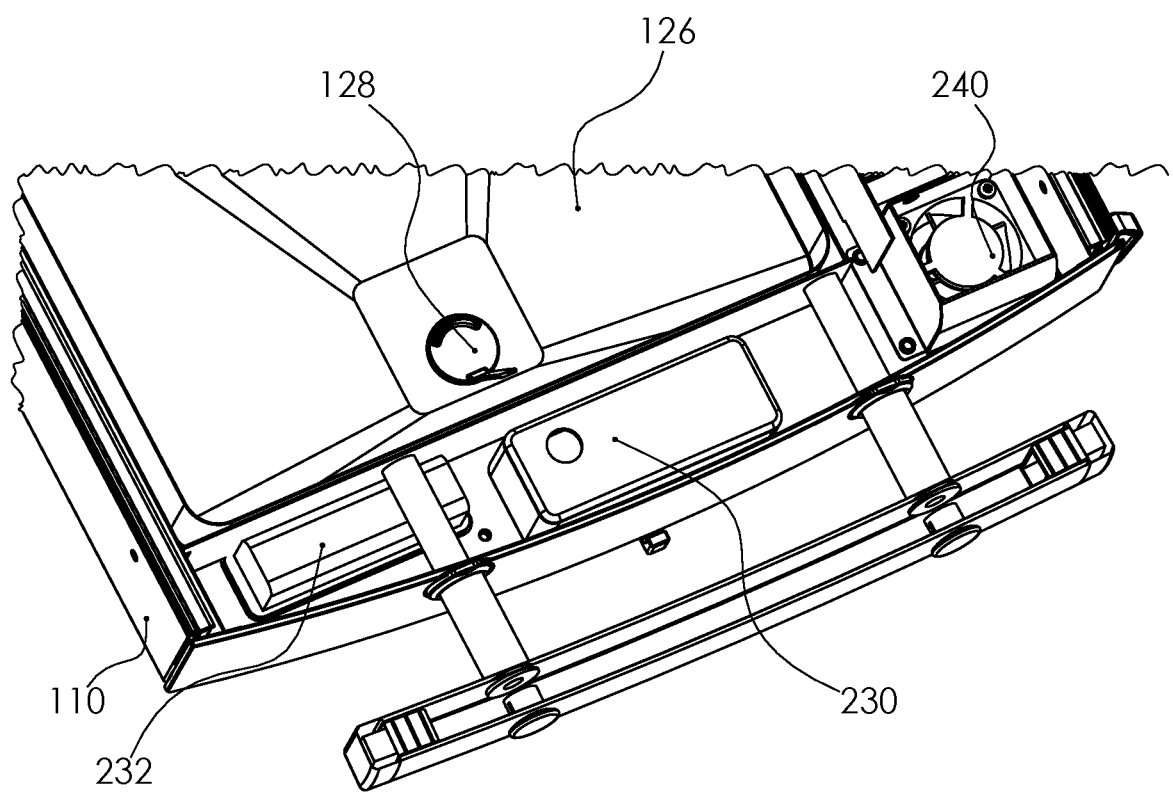
FIG. 10 is a perspective view of drawer details for a cold smoker in accordance with embodiments of the invention.
Figure 11:
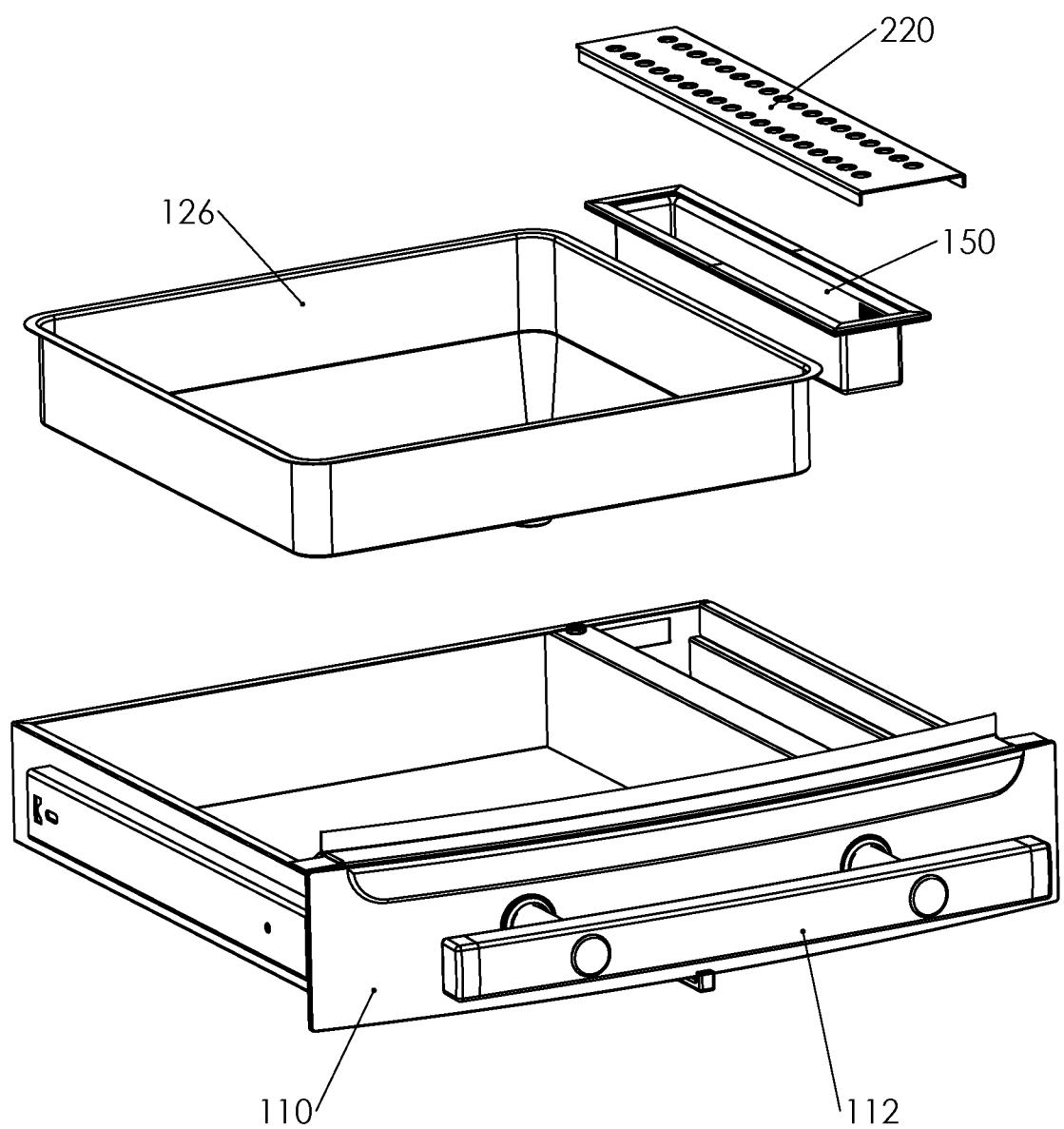
FIG. 11 is a perspective exploded view of a drawer and drawer contents for a cold smoker in accordance with embodiments of the invention.

With particular reference to FIGS. 8 and 10, the drawer 110 may also house a battery pack 232 operatively connected to the fan assembly 240, and an electronic control system 230 for controlling the operation of the fan. The cold smoker 10 may be used by installing a lit fuel tray 150, and a filled ice tray or trays 126 and 210, in the drawer 110, and activating the fan assembly to direct fresh ambient air over the fuel tray cover 152. Such fresh air may cause the fuel in the fuel tray 150 to smolder and produce smoke over a prolonged period of time for smoking food items in the food chamber of the main body 100.

As will be understood by those skilled in the art, the invention may be embodied in other specific forms without departing from the spirit or essential characteristics thereof. The elements described above are provided as illustrative examples for implementing the invention. One skilled in the art will recognize that many other implementations are possible without departing from the present invention as recited in the claims. Accordingly, the disclosure of the present invention is intended to be illustrative, but not limiting, of the scope of the invention. It is intended that the present invention cover all such modifications and variations of the invention, provided they come within the scope of the appended claims and their equivalents.

What is claimed:

1. A food smoking apparatus, comprising:
 a main body defining a substantially enclosed space and having an upper portion and a lower portion;
 a food chamber defined by the upper portion of the main body;
 an open top enclosure movably disposed below the food chamber and within the lower portion of the main body;
 an ice tray compartment formed in the open top enclosure;
 a fuel tray cavity formed in the open top enclosure;
 a divider wall provided between the ice tray compartment and the fuel tray cavity;
 a first ice tray removably disposed within the ice tray compartment below the food chamber, said first ice tray containing water ice and configured to be removed from the open top enclosure and main body; and a fuel tray removably disposed within the fuel tray cavity adjacent to the first ice tray and below the food chamber, wherein said fuel tray contains solid fuel pellets or wood chips and is disposed within the fuel tray cavity so as to be removable from the open top enclosure and main body, and wherein the open top enclosure is moveable relative to the upper portion of the main body in order to provide access to the first ice tray and the fuel tray.

2. The apparatus of claim 1, wherein the open top enclosure is a drawer that is configured to slide relative to the upper portion of the main body.

3. The apparatus of claim 2, further comprising a fan disposed within the main body adjacent to the fuel tray.

4. The apparatus of claim 3, further comprising:
a fan housing having a lower open end, a first side wall, and a second side wall,
wherein the fan is disposed in the fan housing above the lower open end of the fan housing,
wherein the first and second side walls extend generally vertically away from the lower open end to an upper fan housing outlet,
wherein the first side wall includes a curved wall portion that transitions the first side wall from extending generally vertically to extending generally horizontally, and
wherein the fan housing outlet is provided opposite to the curved wall portion of the first side wall.

5. The apparatus of claim 4, further comprising a lip extending away from a bottom edge of the fan housing outlet.

6. The apparatus of claim 5, wherein the lip is generally vertically aligned with a first upper edge of the fuel tray.

7. The apparatus of claim 6, further comprising a fan housing vent provided in the fan housing below the fan housing outlet.

8. The apparatus of claim 7, further comprising:
an air exhaust vent provided in or near an upper surface of the main body;
a chimney provided along a wall of the main body;
a chimney inlet provided at a lower end of the chimney; and
a chimney outlet provided at an upper end of the chimney,
wherein the chimney inlet is adjacent to a second upper edge of the fuel tray, and
wherein the chimney outlet is provided within the main body proximal to the air exhaust vent.

9. The apparatus of claim 8, further comprising a battery disposed within the main body, said battery operatively connected to the fan.

10. The apparatus of claim 9, further comprising a second ice tray disposed within the main body above the first ice tray, said second ice tray being configured to receive water ice.

11. The apparatus of claim 1, further comprising:
a removeable fuel tray lid resting on the fuel tray, said fuel tray lid having a plurality of openings provided therein.

12. The apparatus of claim 11, further comprising:
an array of side wall vents provided in a wall of the main body adjacent to the fuel tray; and
a first flue assembly configured to selectively cover a portion of the array of side wall vents.

13. The apparatus of claim 1, wherein at least a part of the upper portion of the main body is formed by a pair of gull wing doors.

14. The apparatus of claim 13, wherein the upper portion of the main body is formed in part by an openable or removeable lid having a connector for engaging the gull wing doors.

15. The apparatus of claim 1, further comprising a fan disposed within the main body adjacent to the fuel tray.

16. The apparatus of claim 15, further comprising:
a fan housing having a lower open end, a first side wall, and a second side wall,
wherein the fan is disposed in the fan housing above the lower open end of the fan housing,
wherein the first and second side walls extend generally vertically away from the lower open end to an upper fan housing outlet,
wherein the first side wall includes a curved wall portion that transitions the first side wall from extending generally vertically to extending generally horizontally, and
wherein the fan housing outlet is provided opposite to the curved wall portion of the first side wall.

17. The apparatus of claim 16, further comprising a lip extending away from a bottom edge of the fan housing outlet.

18. The apparatus of claim 17, wherein the lip is generally vertically aligned with a first upper edge of the fuel tray.

19. The apparatus of claim 18, further comprising a fan housing vent provided in the fan housing below the fan housing outlet.

20. The apparatus of claim 1, further comprising:
an air exhaust vent provided in or near an upper surface of the main body;
a chimney provided along a wall of the main body;
a chimney inlet provided at a lower end of the chimney; and
a chimney outlet provided at an upper end of the chimney,
wherein the chimney inlet is adjacent to an upper edge of the fuel tray, and
wherein the chimney outlet is provided within the main body proximal to the air exhaust vent.

21. The apparatus of claim 15, further comprising a battery disposed within the main body, said battery operatively connected to the fan.

22. The apparatus of claim 1, further comprising a second ice tray disposed within the main body above the first ice tray, said second ice tray being configured to receive water ice.

23. The apparatus of claim 1, further comprising:
a removeable fuel tray lid resting on an upper edge of the fuel tray, said fuel tray lid having a plurality of openings provided therein.

24. The apparatus of claim 1, further comprising:
an array of side wall vents provided in a wall of the main body adjacent to the fuel tray; and
a first flue assembly configured to selectively cover a portion of the array of side wall vents.

25. The apparatus of claim 1, wherein at least a part of the upper portion of the main body is formed by a pair of gull wing doors.

26. The apparatus of claim 25, wherein the upper portion of the main body is formed in part by an openable or removeable lid having a connector for engaging the gull wing doors.

27. A food smoking apparatus, comprising:
a main body defining a substantially enclosed space;
a food chamber defined by a first portion of the main body;

an open top enclosure movably disposed within the main body;
an ice tray compartment formed in the open top enclosure;
a fuel tray cavity formed in the open top enclosure;
a divider wall provided between the ice tray compartment and the fuel tray cavity;
an ice tray removably disposed within the ice tray compartment adjacent to the food chamber, said ice tray being containing water ice and configured to be removed from the open top enclosure and main body; and
a fuel tray removably disposed within the fuel tray cavity adjacent to the food chamber,
wherein said fuel tray contains solid fuel pellets or wood chips and is disposed within the fuel tray cavity so as to be removable from the open top enclosure and main body, and
wherein the open top enclosure is moveable relative to the main body in order to provide access to the ice tray and the fuel tray.

28. A food smoking apparatus, comprising:
a main body defining a substantially enclosed space and having an upper portion and a lower portion;
a food chamber defined by the upper portion of the main body;
an open top enclosure movably disposed below the food chamber and within the lower portion of the main body;
an ice tray compartment formed in the open top enclosure;
a fuel tray cavity formed in the open top enclosure;
a divider wall provided between the ice tray compartment and the fuel tray cavity;
a first ice tray removably disposed within the ice tray compartment below the food chamber, said first ice tray containing water ice and configured to be removed from the open top enclosure and main body;
a fuel tray removably disposed within the fuel tray cavity adjacent to the first ice tray and below the food chamber; and
an array of side wall vents provided in a wall of the main body adjacent to the fuel tray,
wherein said fuel tray contains solid fuel pellets or wood chips and is disposed within the fuel tray cavity so as to be removable from the open top enclosure and main body, and
wherein the open top enclosure is moveable relative to the upper portion of the main body in order to provide access to the first ice tray and the fuel tray.

* * * * *